US006322601B1

(12) United States Patent
Semedard et al.

(10) Patent No.: US 6,322,601 B1
(45) Date of Patent: Nov. 27, 2001

(54) CYCLONE SEPARATOR SMOKE INLET TRUNKING

(75) Inventors: Jean-Claude Semedard, Paris; Eugène Guilleux, Villebon sur Yvette, both of (FR)

(73) Assignee: ABB Alstom Power Combustion, Velizy Cedex (FR)

( * ) Notice: Subject to any disclaimer, the term of this patent is extended or adjusted under 35 U.S.C. 154(b) by 0 days.

(21) Appl. No.: 09/482,515

(22) Filed: Jan. 14, 2000

(30) Foreign Application Priority Data

Jan. 18, 1999 (FR) ........................................ 99 00464

(51) Int. Cl.[7] ........................ B01D 45/16; B01D 50/00

(52) U.S. Cl. ........................ 55/318; 55/459.1; 55/459.5

(58) Field of Search ........................ 55/318, 459.1, 55/459.2, 459.3, 459.4, 459.5

(56) References Cited

U.S. PATENT DOCUMENTS 3,990,634 * 11/1976 Hejlek ........................ 55/459.1
5,771,844 6/1998 Diet .

FOREIGN PATENT DOCUMENTS 0 284 184 A1 9/1988 (EP) .
0 494 650 A2 7/1992 (EP) .
0 763 384 A1 3/1997 (EP) .
5-38408 * 2/1993 (JP) ........................ 55/459.1
WO 86/04271 7/1986 (WO) .

* cited by examiner

*Primary Examiner*—Robert A. Hopkins
(74) *Attorney, Agent, or Firm*—Sughrue, Mion, Zinn, Macpeak & Seas, PLLC

(57) ABSTRACT

Smoke inlet trunking for a cyclone separator has two lateral faces referred to as an extrados face and an intrados face, the latter terminating at a nose of the cyclone, a ceiling face and a floor face. The intrados face, which connects a point at the start of the trunking to a point at the nose of the cyclone, has a profile such that it includes at least two separate tangents such that one tangent intersects the extrados face at a point upstream of the foot of a perpendicular to the extrados face dropped from the nose of the cyclone. The intrados face begins at the point at the start of the trunking with a first part having a rectilinear profile followed by a second part having a curvilinear profile with a point of inflexion or a second rectilinear part connected to the nose of the cyclone and the point at the start of the trunking is located at an outlet from the furnace.

7 Claims, 3 Drawing Sheets

CYCLONE SEPARATOR SMOKE INLET TRUNKING

BACKGROUND OF THE INVENTION

1. Field of the Invention

The present invention concerns smoke inlet trunking of a cyclone separator.

2. Description of the Prior Art

The invention applies in particular, although this is not limiting on the invention, to large installations, for example installations rated at 250 MW to 600 MW, which include a plurality of cyclone separators disposed side by side at the outlet from a furnace. In such installations there is insufficient room to dispose the inlet trunking of the separators correctly because of the congestion due to the presence of various beams. The conventional disposition of the inlet trunking of a cyclone separator at the outlet from a furnace is therefore that shown in FIG. 1, which is a schematic plan view of a cyclone separator 1 with its inlet trunking 2 at the outlet from a furnace 3. The inlet trunking has two lateral faces 4 and 5 and a floor face and a ceiling face which cannot be seen in this view.

The face 4 is referred to as the intrados face and the face 5 as the extrados face. Because of congestion, the intrados face is very frequently at an acute angle α to the exit face of the chamber.

The resulting disposition of the trunking, because of this congestion, is not favorable to good efficiency of the separator.

Because the intrados face 4 is inclined at an acute angle α, the solid particles of smoke at the outlet from the furnace 3 are mostly collected by this face, which concentrates them and directs most of them to the nose D of the cyclone, where the centrifugal effect is insufficient, enabling them to escape toward the orifice of the vortex capture skirt.

U.S. Pat. No. 5,771,844 discloses a cyclone separator in which the inlet trunking 12 is extended into the interior of the furnace and the first part of intrados face 13 of the inlet trunking, inside the furnace, is curved.

The present invention proposes to improve the efficiency of such cyclone separators by particular arrangements of the inlet trunking.

SUMMARY OF THE INVENTION

The invention therefore consists in smoke inlet trunking for a cyclone separator, the trunking having two lateral faces referred to as an extrados face and an intrados face, the latter terminating at a nose of the cyclone, a ceiling face and a floor face, the intrados face, which connects a point at the start of the trunking to a point at the nose of the cyclone having a profile such that it includes at least two separate tangents such that one tangent intersects the extrados face at a point upstream of the foot of a perpendicular to the extrados face dropped from the nose of the cyclone, wherein the intrados face begins at the point at the start of the trunking with a first part having a rectilinear profile followed by a second part having a curvilinear profile with a point of inflexion or a second rectilinear part connected to the nose of the cyclone and the point at the start of the trunking is located at an outlet from the furnace.

According to another feature of the invention the intrados face has grooves inclined downward from the outlet from the furnace toward the cyclone separator. This arrangement encourages entry of solid particles into the inlet trunking toward the bottom of the cyclone, and can also be used on the extrados face According to another feature of the invention the ceiling face forms a boss constituting a profile having a descending first part followed by an ascending part in a lengthwise direction of the trunking from the outlet from the furnace toward the inlet of the cyclone.

According to another feature of the invention the boss is such that the reduction of height in each section of the trunking is greater on the intrados side than on the extrados side.

The invention will now be described with reference to the accompanying drawings.

DETAILED DESCRIPTION OF THE PREFERRED EMBODIMENTS

Figure 2:
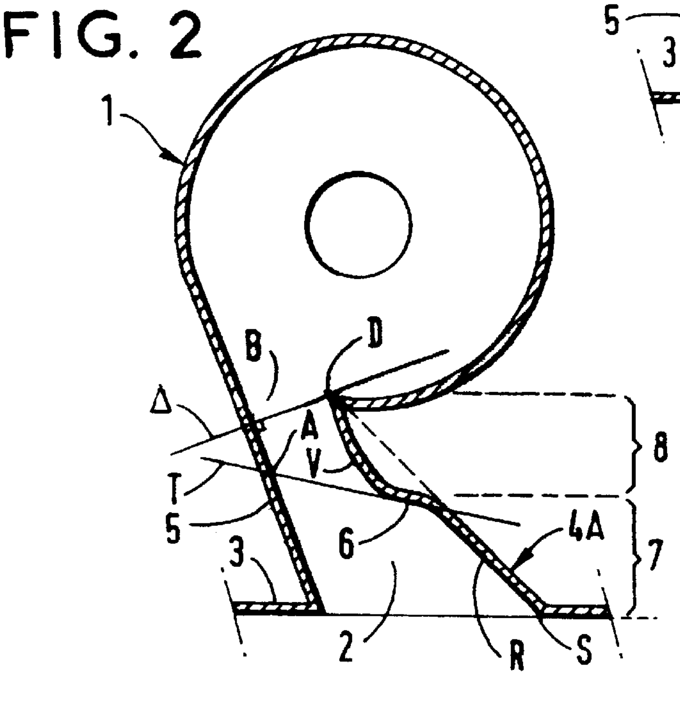
FIG. 2 is a diagrammatic representation of a cyclone separator with inlet trunking in accordance with the invention, showing in particular the profile of the intrados face.

FIG. 2 shows a cyclone separator 1 connected to the smoke outlet of a furnace 3 by inlet trunking 2. The figure shows the two lateral faces of the trunking 2, i.e. the intrados face 4A and the extrados face 5.

In accordance with the invention, the intrados face 4A begins, at a point S at the exit from the furnace 3, with a rectilinear part R followed by a curvilinear part V including a point of inflexion 6. The tangent to the point of inflexion 6 intersects the extrados 5 at a point A upstream of a point B which is the foot of a perpendicular Δ to the extrados dropped from the nose D of the cyclone. This disposition provides a first area 7 for collecting the solid particles followed by an area 8 in which the direction of the solids changes.

Figure 1:
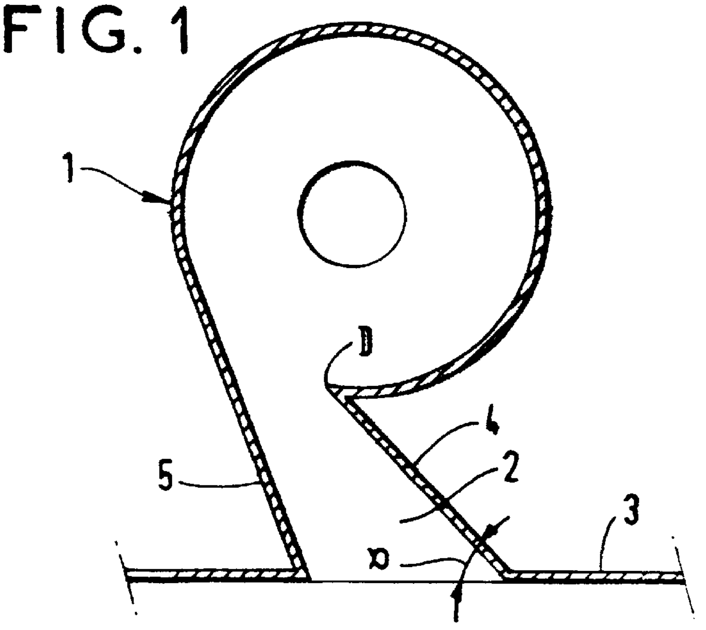
FIG. 1, already commented on, is a diagram showing a prior art arrangement.
Figure 3:
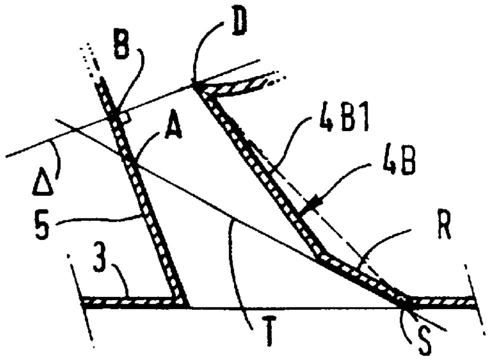
FIG. 3 shows a variant of the inlet trunking.

FIG. 3 shows a variant of the invention in which the intrados face 4B begins at said point S, as in FIG. 2, with a first part having a rectilinear profile R followed by a second part 4B1 which is also rectilinear and is joined to the nose D of the cyclone 1.

A line extending the first part with the rectilinear profile R intersects the extrados 5 at a point A upstream of a point B which is the foot of the perpendicular to the extrados 5 dropped from the nose D of the cyclone.

Accordingly, by virtue of the profile of the intrados face 4A (FIG. 2) or 4B (FIG. 3), solid particles in the smoke from the furnace 3 are directed onto the extrados face 5 at the inlet of the cyclone, with the attendant benefit of the maximum centrifuging radius.

Figure 4:
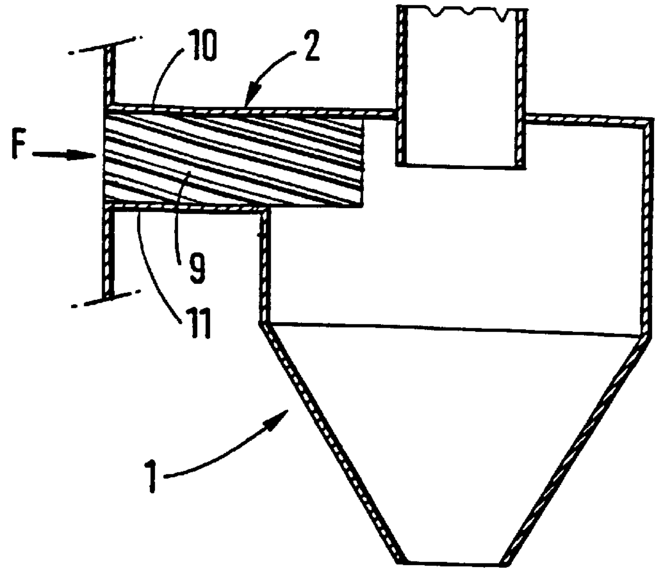
FIGS. 4, 5 and 6 are three diagrammatic views showing a complementary disposition of the trunking on the intrados face, and possibly on the extrados face, complementing the disposition on the intrados face shown in FIG. 2 or FIG. 3.

Apart from this disposition, in accordance with FIGS. 2 and 3, it is advantageous to provide grooves 9, in particular on the intrados face 4A, 4B but also on the extrados face 5, as shown in FIG. 4, which is a diagrammatic elevation view of the cyclone separator 1 with its inlet trunking 2. The grooves 9 are inclined downward from the exit from the furnace toward the cyclone separator 1. The aim of this disposition is to encourage separation by gravity at the inlet of the cyclone.

Figure 5:
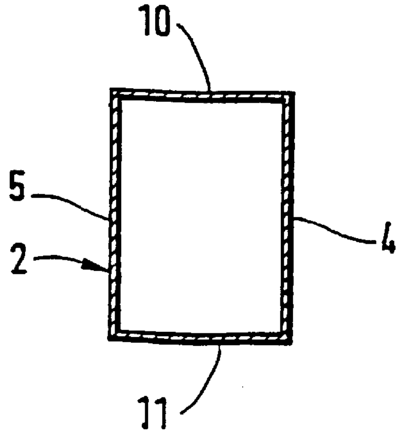

FIG. 5 is a simplified sketch showing the section where the smoke enters the trunking 2, as seen in the direction of the arrow F in FIG. 4, and the four faces of the trunking 2, i.e. the intrados face 4A, 4B, the extrados face 5, the ceiling face 10 and the floor face 11.

The inclined grooves 9 shown diagrammatically in FIG. 4 are provided on the extrados face 5 but can equally be provided on the intrados face 4A, 4B.

The grooves 9 are inclined to the horizontal at an angle from 5° to 25°.

Figure 6:
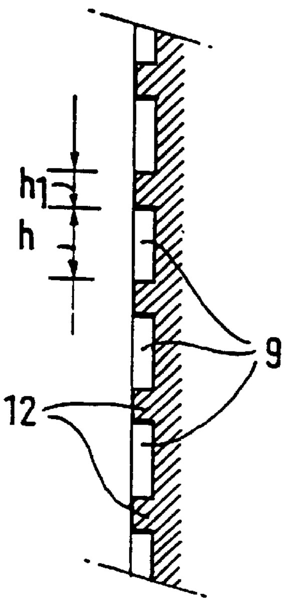

FIG. 6 is a diagram showing the cross-section of the grooves. They advantageously have a height h from 200 mm to 400 mm and a depth less than 50 mm and are separated by solid parts 12 which have a height h1 from 100 mm to 300 mm.

Figure 7:
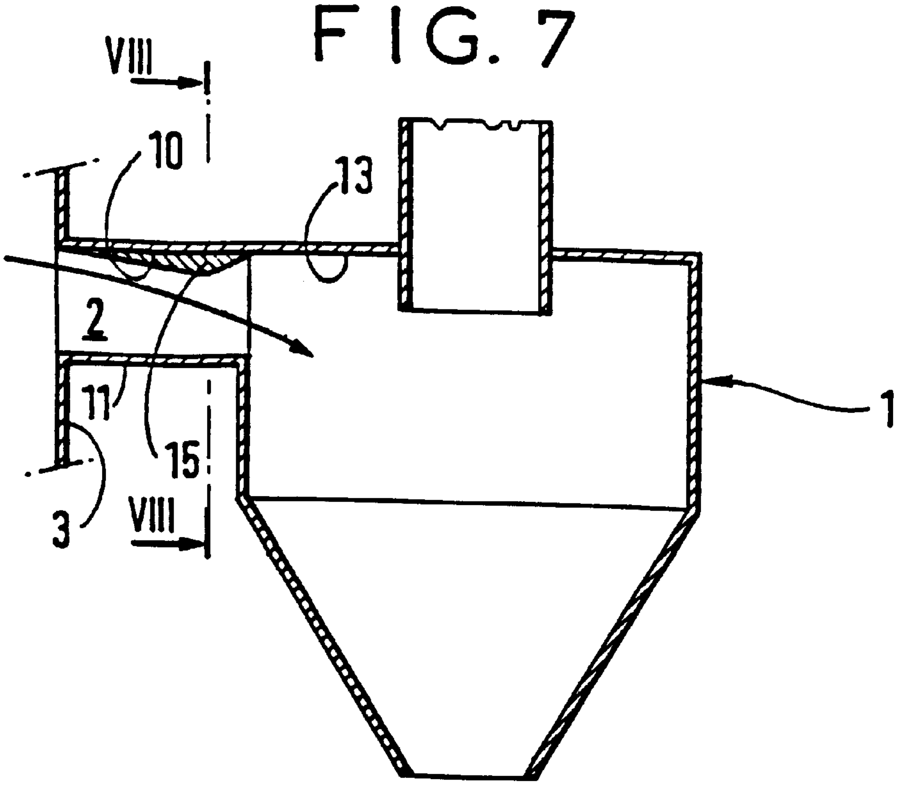
FIGS. 7 and 8 are two diagrammatic views showing a complementary disposition on the ceiling face of the inlet trunking, FIG. 7 showing the inlet trunking longitudinally and FIG. 8 showing a cross-section.
Figure 8:
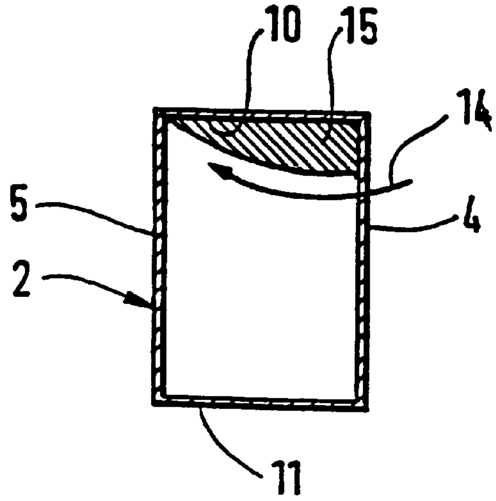

Finally, FIGS. 7 and 8 show a disposition on the ceiling face 10 such that the solid particles are detached from the ceiling 13 of the cyclone and migrate on the ceiling from the intrados face 4A, 4B toward the extrados face 5, as shown by the arrow 14 (FIG. 8), so encouraging separation by gravity and increasing the centrifuging radius of the solid particles.

This disposition consists in a ceiling boss 15, as shown in both FIGS. 7 and 8.

The boss 15 constitutes a three-dimensional skewed profile bringing about, in the lengthwise direction of the trunking 2, as shown in FIG. 7, firstly, at the outlet from the furnace 3, a contraction of the cross-section of the trunking and then an expansion of the cross-section ahead of the inlet to the cyclone 1.

In the transverse direction, as shown in FIG. 8, corresponding for example to the section plane VIII—VIII in FIG. 7, the asymmetric boss 15 reduces the flow height in the trunking from the extrados face 5 toward the intrados face 4A, 4B.

For example, for a cyclone separator having a diameter of 10 m, a height of 25 m and a trunking height of 4 m, the boss 15, as shown in FIG. 7, has a slope of less than 20% over a length of 5 m in the longitudinal direction, i.e. the height of the boss is 1 m. In the transverse direction (FIG. 8) there is a progressive transition between the reduced height ceiling on the intrados 4 side and the non-reduced height ceiling on the extrados side 5.

There is claimed:

1. Smoke inlet trunking for a cyclone separator at an outlet of a furnace, said trunking having two lateral faces referred to as an extrados face and an intrados face, the latter terminating at a nose of said cyclone, a ceiling face and a floor face, said intrados face, which connects a point at the start of said trunking, wherein said point is at the outlet of said furnace, to a point at the nose of the cyclone having a profile such that said intrados face includes at least two separate tangents such that one tangent intersects said extrados face at a point upstream of the foot of a perpendicular to said extrados face dropped from said nose of said cyclone, wherein said intrados face begins at said point at the start of said trunking with a first part having a rectilinear profile followed by a second part which extends from the first part to said nose of said cyclone.

2. The smoke inlet trunking for a cyclone separator according to claim 1, wherein the second part of said intrados face has a rectilinear profile which extends from the first part of the intrados face to said nose of said cyclone.

3. The smoke inlet trunking for a cyclone separator according to claim 1, wherein the second part of said intrados face has a curvilinear profile with a point of inflexion, which extends from the first part of the intrados face to said nose of said cyclone.

4. Smoke inlet trunking for a cyclone separator, said trunking having two lateral faces referred to as an extrados face and an intrados face, the latter terminating at a nose of said cyclone, a ceiling face and a floor face, said intrados face, which connects a point at the start of said trunking to a point at the nose of the cyclone having a profile such that said intrados face includes at least two separate tangents such that one tangent intersects said extrados face at a point upstream of the foot of a perpendicular to said extrados face dropped from said nose of said cyclone, wherein said intrados face begins at said point at the start of said trunking with a first part having a rectilinear profile followed by a second part extending from the starting point of said one tangent on said intrados face to said nose of said cyclone and said point at the start of said trunking is located at an outlet from a furnace, wherein said intrados face has grooves inclined downward from said outlet from said furnace toward said cyclone separator.

5. Smoke inlet trunking for a cyclone separator, said trunking having two lateral faces referred to as an extrados face and an intrados face, the latter terminating at a nose of said cyclone, a ceiling face and a floor face, said intrados face, which connects a point at the start of said trunking to a point at the nose of the cyclone having a profile such that said intrados face includes at least two separate tangents such that one tangent intersects said extrados face at a point upstream of the foot of a perpendicular to said extrados face dropped from said nose of said cyclone, wherein said intrados face begins at said point at the start of said trunking with a first part having a rectilinear profile followed by a second part extending from the starting point of said one tangent on said intrados face to said nose of said cyclone and said point at the start of said trunking is located at an outlet from a furnace, wherein said extrados face has grooves inclined downward from said outlet from said furnace toward said cyclone separator.

6. Smoke inlet trunking for a cyclone separator, said trunking having two lateral faces referred to as an extrados face and an intrados face, the latter terminating at a nose of said cyclone, a ceiling face and a floor face, said intrados face, which connects a point at the start of said trunking to a point at the nose of the cyclone having a profile such that said intrados face includes at least two separate tangents such that one tangent intersects said extrados face at a point upstream of the foot of a perpendicular to said extrados face dropped from said nose of said cyclone, wherein said intrados face begins at said point at the start of said trunking with a first part having a rectilinear profile followed by a second part extending from the starting point of said one tangent on said intrados face to said nose of said cyclone and said point at the start of said trunking is located at an outlet from a furnace, wherein said ceiling face forms a boss constituting a profile having a descending first part followed by an ascending part in a lengthwise direction of said trunking from said outlet from said furnace toward said inlet of said cyclone.

7. The trunking claimed in claim 6 wherein said boss is such that the reduction of height in each section of said trucking is greater on the intrados side than on the extrados side.

* * * * *